(12) United States Patent
Lee et al.

(10) Patent No.: US 6,433,093 B2
(45) Date of Patent: Aug. 13, 2002

(54) MELT PROCESSIBLE FLUOROPOLYMER COMPOSITES

(75) Inventors: Jeong C Lee; Shosaku Kondo; Hajime Sato, all of Shimizu (JP)

(73) Assignee: DuPont-Mitsui Flourochemicals Co. Ltd., Tokyo (JP)

( * ) Notice: Subject to any disclaimer, the term of this patent is extended or adjusted under 35 U.S.C. 154(b) by 0 days.

(21) Appl. No.: 09/735,559

(22) Filed: Dec. 13, 2000

(30) Foreign Application Priority Data

Dec. 24, 1999 (JP) ............................................ 11-366797

(51) Int. Cl.[7] .............................. D01F 6/48; D01F 8/10; D01F 6/92; C08L 27/12; C08L 27/18
(52) U.S. Cl. ........................ 525/199; 525/200; 428/361; 428/362; 428/373; 428/375; 428/392; 428/394; 428/395
(58) Field of Search ................................. 525/199, 200; 428/361, 362, 373, 375, 392, 394, 395

(56) References Cited

U.S. PATENT DOCUMENTS 6,166,138 A * 12/2000 Kolouch ...................... 525/166

FOREIGN PATENT DOCUMENTS

| EP | 0 626 424 A1 | 12/1993 |
| EP | 0 709 428 A1 | 5/1996 |
| EP | 0 728 776 A1 | 8/1996 |
| EP | 0 902 050 A1 | 3/1999 |

OTHER PUBLICATIONS

Journal of Macromolecular Science, Chemical Physics 1995, C35, pp. 183–238.

* cited by examiner

Primary Examiner—Nathan M. Nutter

(57) ABSTRACT

A fluoropolymer article containing functionalized fluoropolymer is reinforced with fibrous liquid-crystal polymer.

8 Claims, 2 Drawing Sheets

MELT PROCESSIBLE FLUOROPOLYMER COMPOSITES

FIELD OF THE INVENTION

This invention relates to fluoropolymer reinforced with fibrous liquid-crystal polymer.

BACKGROUND OF THE INVENTION

The non-melt processible fluoropolymer polytetrafluoroethylene (PTFE) and melt processible fluoropolymers such as tetrafluoroethylene-perfluoro(alkyl vinyl ether) copolymers (PFA), tetrafluoroethylene-hexafluoropropylene copolymers (FEP), and tetrafluoroethylene-ethylene copolymers (ETFE) have excellent properties such as heat resistance, chemical resistance and non-stick properties. However, in spite of the excellent characteristics of these fluoropolymers, the physical properties of the fibers obtained therefrom are not always entirely satisfactory. In the melt spinning step in particular, the very high melt viscosity of fluoropolymers compared with other engineering plastics creates a number of problems, including greater difficulty in spinneret design and the need for effective measures against filament breakage during take-off. Also, in subsequent steps such as drawing of the melt-spun filament, the lower modulus of fluoropolymers compared to other engineering plastics, greatly hinders stable operation. Moreover, fluoropolymers have a large linear expansion coefficient, and so high-temperature shrinkage of the fluoropolymer filaments is great.

Modification of a fluoropolymer/liquid-crystal polymer composite so as to enhance the fluoropolymer matrix strength has been proposed. During extrusion, the liquid-crystal polymer is oriented in a fibrous form within the fluoropolymer matrix, thereby enhancing the matrix strength. This is discussed in *Journal of Macromolecular Science, Chemical Physics* 1995, C35, p. 183; and in JP-A 2-32147. The resulting extrudate exhibits an increase in strength because of the presence of oriented fibrous liquid-crystal polymer, but not all the liquid-crystal polymer is fiberized by the extrusion process and the dispersion of the liquid-crystal polymer within the extrudate is not uniform. Compared with resins reinforced using conventional reinforcements such as glass fibers and carbon fibers, advantages offered by this approach include a decrease in melt viscosity and the simplification of all the processing steps that is made possible by the use of liquid-crystal polymers.

However, the mechanical strength of fluoropolymer/liquid-crystal polymer composite fibers obtained by melt spinning is strongly influenced by the interfacial bonding forces between the fluoropolymer matrix and the fibrous liquid-crystal polymer present within the matrix. Moreover, because there is substantially no molecular interaction between the fluoropolymer and the liquid-crystal polymer, the interfacial bonding forces between the fluoropolymer and the liquid-crystal polymer are very small. Hence, the greater strength of the liquid-crystal polymer within the fluoropolymer matrix is not transferred to the matrix.

Liquid-crystal polymer reinforced fluoropolymer articles in which the liquid-crystal polymer is well dispersed and reinforces the fluoropolymer are needed.

SUMMARY OF THE INVENTION

This need is satisfied by a melt processible fluoropolymer composite article comprising at least one melt processible fluoropolymer, wherein some of said melt processible fluoropolymer contains functional groups, reinforced with fibrous thermoplastic liquid-crystal polymer.

DETAILED DESCRIPTION

Figure 1:
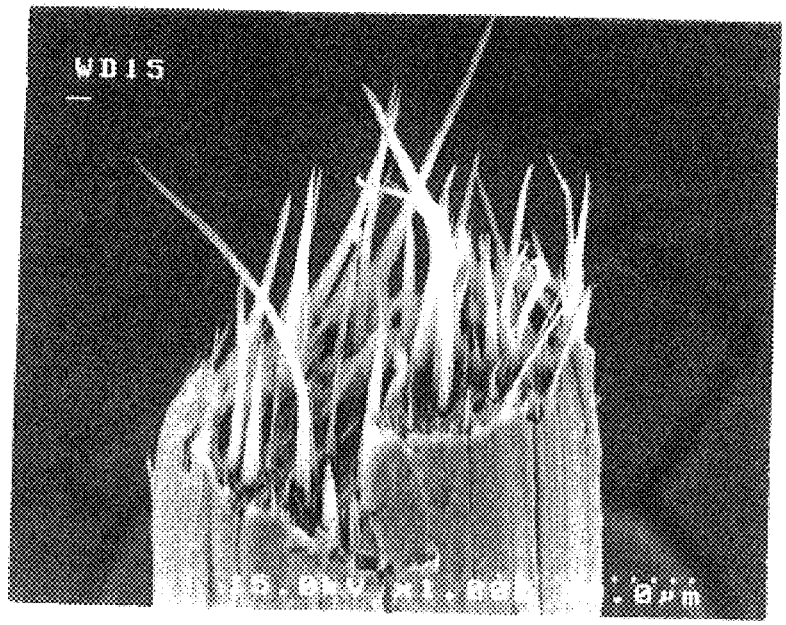
FIG. 1 is an electron micrograph at 1000× magnification showing the fracture plane of the fluoropolymer composite fiber obtained in Example 1.

At least two types of melt processible fluoropolymer are used in the present invention: 1) a nonfunctional melt processible fluoropolymer of the type commonly employed in molding and forming, and 2) a functional melt processible fluoropolymer, that is, a fluoropolymer bearing functional groups. Nonfunctional melt processible fluoropolymers for use in polymer fabricating processes are already well known in the art, and include polymers or copolymers of, for instance, unsaturated fluorinated hydrocarbons, unsaturated fluorochlorinated hydrocarbons, and ether group-bearing unsaturated fluorinated hydrocarbons, as well as copolymers of such unsaturated fluorinated hydrocarbons with ethylene. Typical examples include polymers and copolymers of monomers selected from among tetrafluoroethylene, chlorotrifluoroethylene, hexafluoropropylene, perfluoro (alkyl vinyl ether), vinylidene fluoride and vinyl fluoride; and copolymers of the above monomers with ethylene.

Specific examples of nonfunctional melt processible fluoropolymer include tetrafluoroethylene-perfluoro(alkyl vinyl ether) copolymers (PFA), tetrafluoroethylene-hexafluoropropylene copolymers (FEP), tetrafluoroethylene-hexafluoropropylene perfluoro(alkyl vinyl ether) copolymers (EPE), tetrafluoroethylene-ethylene copolymers (ETFE), polyvinylidene fluoride (PVDF), polyvinyl fluoride (PVF), polychlorotrifluoroethylene (PCTFE) and chlorotrifluoroethylene-ethylene copolymers (ECTFE).

In the practice of the invention, in addition to the foregoing melt processible fluoropolymer, use is also made of functional melt processible fluoropolymer, also known as a compatibilizing agent, which is a melt processible fluoropolymer containing functional groups such as carboxyl and derivative groups thereof, hydroxyl, nitrile, cyanato, carbamoyloxy, phosphonoxy, halophosphonoxy, sulfonic and derivative groups thereof, and sulfohalide. These compatibilizing agents contain the above functional groups within a range that does not to any great degree compromise the characteristics of the melt processible fluoropolymer. The compatibilizing agent may be prepared by synthesizing a nonfunctional melt processible fluoropolymer such as one of those mentioned above, then introducing therein the functional groups, either by addition or substitution. Alternatively, the compatibilizing agent may be prepared by copolymerizing monomers bearing the desired functional groups when the above-described melt processible fluoropolymer is synthesized. The functional melt processible copolymer need not be of the same polymer family, for example FEP, PFA, or ETFE, as the nonfunctional melt processible fluoropolymer, as long as the polymers are reasonably compatible. However, it is preferred that the functional and nonfunctional fluoropolymers be of the same polymer family.

Specific examples of the functional groups include —COOH, —CH$_2$COOH, —COOCH$_3$, —CONH$_2$, —OH, —CH$_2$OH, —CN, —CH$_2$O(CO)NH$_2$, —CH$_2$OCN, —CH$_2$OP(O)(OH)$_2$, —CH$_2$OP(O)Cl$_2$, and —SO$_2$F. These functional groups may be introduced into the compatibilizing agent by copolymerizing functional group-bearing fluorinated monomers at the time of fluoropolymer production.

Illustrative examples of such functional group-bearing fluorinated monomers suitable for copolymerization include fluorinated vinyl ether compounds of the formula $$CF_2=CF[OCF_2CF(CF_3)]_m-O-(CF_2)_n-X.$$

In the formula, m is from 0 to 3; n is from 1 to 4; and X is a functional group such as —COOH, —CH$_2$COOH, —COOCH$_3$, —CH$_2$OH, —CN, —CH$_2$O(CO)NH$_2$, —CH$_2$OCN, —CH$_2$OP(O)(OH)$_2$, —CH$_2$OP(O)Cl$_2$, and —SO$_2$F. Preferred examples of such fluorinated vinyl ethers include those of the formula $$CF_2=CF-Of-CF_2CF_2-SO_2F$$

or the formula $$CF_2=CF[OCF_2CF(CF_3)]O(CF_2)_2-Y$$

wherein Y is —SO$_2$F, —CN, —COOH, or —COOCH$_3$; and those of the formula $$CF_2=CF[OCF_2CF(CF_3)]O(CF_2)_2-CH_2-Z$$

wherein Z is —COOH, —OH, —OCN, —OP(O)(OH)$_2$, —OP(O)Cl$_2$, or O(CO)NH$_2$.

These functional group-containing monomers are copolymerized in the compatibilizing agent in an amount of preferably about 0.5 to 10% by weight, and especially about 1 to 5% by weight. Too little functional group-containing monomer in the compatibilizing agent limits the effects of the compatibilizing agent, which are:
1) uniform dispersion of the liquid-crystal polymer in the fluoropolymer matrix during melt blending of the article and, after melt spinning,
2) bonding of the resultant fibrous liquid-crystal polymer to and within the fluoropolymer matrix, which is a blend of the nonfunctional fluoropolymer and functional fluoropolymer.

On the other hand, too much compatibilizing agent may give rise to reactions similar to crosslinking reactions on account of strong interactions between molecules of the compatibilizing agent. This could cause a sudden rise in the melt viscosity of the spinning dope composition, leading to complications in melt spinning.

The viscosity or molecular weight of the compatibilizing agent is not subject to any particular limitation provided they are within ranges which do not differ greatly from the viscosity or molecular weight of the melt processable fluoropolymer in which compatibilizing agent is blended, and are preferably at about the same range.

The liquid-crystal polymer used in the invention is a thermoplastic resin which forms thermotropic liquid-crystals. As is known in the art, liquid-crystal polymers are characterized by their ability to form regions of high molecular orientational order in the melt. No particular limitation is imposed on the melting point of the liquid-crystal polymer, except insofar as it does not compromise the heat resistance at the melt-processing temperature. However, a liquid-crystal polymer having a melting point at least about 20° C. higher than the melting point of the melt processible fluoropolymer for fabrication is preferred for good melt-processability and heat stability. Illustrative examples of such liquid-crystal polymers include polyesters, polyesteramides, polyesterimides and polyesterurethanes. Of these, polyesters are especially preferred. Typical liquid-crystal polyesters include wholly aromatic polyesters, of which many types are already known. Suitable examples include those derived from aromatic dicarboxylic acids and aromatic dihydroxy compounds and/or aromatic hydroxycarboxylic acids. A portion of the polyester may be substituted with polymeric units derived from, for example, aliphatic dicarboxylic acids, aliphatic dihydroxy compounds or aliphatic hydroxycarboxylic acids. Specific examples include polyesters having polymeric units derived from aromatic dicarboxylic acids such as terephthalic acid, isophthalic acid, or 2,6-naphthalenedicarboxylic acid, aromatic dihydroxy compounds such as hydroquinone, resorcinol, 2,6-dihydroxynaphthalene; bisphenol A or dihydroxydiphenyl; and aromatic hydroxycarboxylic acids such as p-hydroxybenzoic acid.

The fibrous liquid-crystal polymer-containing fluoropolymer composite article of the present invention is fabricated from the above-described melt processable fluoropolymer, functional group-containing fluoropolymer, and liquid-crystal polymer. In the formation of this composite article, the proportion of the latter functional group-bearing fluoropolymer (compatibilizing agent) varies according to the type of functional groups and the functional group content. Such proportion is an effective amount of the compatiblizing agent sufficient to cause bonding of the liquid-crystal polymer fibers to the fluoropolymer matrix forming the article. Such amount is preferably from about 1 to 20% by weight, and especially from about 1 to 10% by weight, of the polymer starting materials. That is, a higher proportion of compatibilizing agent results in a lower interfacial tension between the fluoropolymer and the liquid-crystal polymer and stronger interfacial bonding forces. However, the incorporation of too much compatibilizing agent may lead to crosslinking-like reactions owing to strong interactions between molecules of the compatibilizing agent. This can in turn cause a rapid rise in viscosity during melt mixing of the fluoropolymer and the liquid-crystal polymer, which may make melt spinning difficult to carry out.

The proportion of liquid-crystal polymer in the above resin starting materials is generally within a range of about 1 to 40% by weight, and preferably about either 3 or 5 to 40% by weight, and more preferably about 3 to 20% by weight. Too little liquid-crystal polymer is unlikely to provide a sufficient reinforcing effect. On the other hand, too much liquid-crystal polymer may have the effect of making the fluoropolymer matrix the discontinuous phase or may result in a fibrous liquid-crystal polymer of excessive diameter. If the liquid-crystal polymer has too large a diameter, the viscosity at that portion in the melt spinning step becomes suddenly very low, which may cause filament breakage.

The melt processible fluoropolymer composite article of the invention can most easily and advantageously be obtained in the form of composite fibers by melting and blending together the melt processable fluoropolymer, the functional group-containing fluoropolymer, and the thermoplastic liquid-crystal polymer. This method has the advantages that melt processing is easy and the liquid-crystal polymer can readily be uniformly dispersed as very fine liquid particles within the fluoropolymer matrix. Melting and blending is carried out by conventional methods. A method involving the use of an extruder is preferred. Because high shear rate provides better dispersion of the liquid-crystal polymer particles, a twin-screw extruder is preferable to a single-screw extruder for this purpose.

To minutely disperse the liquid-crystal polymer disperse phase within the fluoropolymer matrix, the extrusion temperature should preferably be about 10 to 20° C. higher than the melting point of the highest melting of the resins—the melt processible fluoropolymers and the thermoplastic liquid-crystal polymer. In addition, to ensure uniform dispersion of the liquid-crystal polymer in fibrous form throughout the fluoropolymer composite fibers in the later melt spinning process, the particle size of the liquid-crystal polymer before melt spinning should be not more than about 10 $\mu$m, and preferably about 0.5 to 5 $\mu$m. The composite fibers can be continuous, as spun as filaments, or can be later chopped up for refabrication into other shapes, for example by injection molding or extrusion, or for use in reinforcing other fluoropolymers Other methods that may be used for making the fluoropolymer composite fibers include ordinary methods of manufacturing bicomponent fibers, such as a sheath-core process in which the liquid-crystal polymer serves as the core component and the fluoropolymer serves as the sheath component, and a bilateral process. Thus the fibrous liquid-crystal polymer present along with the fluoropolymer to form the composite article of the present invention can be in the form of continuous or discontinuous fibers dispersed within a fluoropolymer matrix, or in the form of a continuous filamentary material running side by side with the fluoropolymer to form bicomponent fibers. Examples of non-fibrous fluoropolymer composite articles to which the present invention relates include those produced by forming chip- or pellet-type particles from a composite fiber obtained as described above, then fabricating articles by melt-processing the particles into the desired shape while maintaining the liquid-crystal polymer in a fibrous form. Examples of suitable fabrication techniques include injection molding, extrusion, compression molding, blow molding, rotational molding, and transfer molding. The processing temperature, which is chosen to strike a balance between the processibility of the fluoropolymer and the physical properties of the article to be obtained, is not less than the melting point of the fluoropolymer and not more than the melting point of the liquid-crystal polymer, and preferably within a range from about 10° C. above the melting point of the fluoropolymer to about 5° C. to about 30° C. below the melting point of the liquid-crystal polymer. If the processing temperature is higher than the melting point of the liquid-crystal polymer, the liquid-crystal polymer that has been dispersed in a fibrous form melts and ceases to exhibit a fibrous structure. In such non-fibrous composite articles, the diameter of the fibrous liquid-crystal polymer is preferably not more than about 30 $\mu$m, and especially within a range of about 1 to 10 $\mu$m. The aspect ratio is preferably at least about 50, and especially at least about 100.

If necessary, suitable additives may be included in the melt processible resin composite articles of the invention. Examples of such additives are antioxidants, light stabilizers, antistatic agents, fluorescent whiteners, colorants and carbon black.

EXAMPLES

Melt flow is measured according to the procedure of ASTM 1238, except where otherwise noted.

Example 1

A fluoropolymer (PF004, a PFA produced by DuPont-Mitsui Fluorochemicals Co., Ltd. melting point, 304° C.; melt flow rate, as measured at 372° C. under a 5 kg load, 35 g/10 min) and a liquid-crystal polymer (Zenite 7000, produced by E. I. du Pont de Nemours & Co., Inc.; melting point, 353° C.) are thoroughly dried, then melt-blended (melt temperature, 365° C.) in a twin-screw extruder together with compatibilizing agent A that is a terpolymer of tetrafluoroethylene, perfluoro(propyl vinyl ether) (PPVE), and $CF_2=CF(OCF_2CF(CF_3))OCF_2CF_2CH_2OH$ (9,9-dihydro-9-hydroxyperfluoro(3,6-dioxa-5-methyl-1-nonene)) (PPVE content of compatibilizing agent, 3.7% by weight; hydroxyl group-bearing monomer content, 1.1% by weight; melt flow rate, 15 g/10 min), thereby forming a fluoropolymer mixture. The liquid-crystal polymer and compatibilizing agent A are blended in respective ratios of 10% by weight and 2% by weight.

The resulting fluoropolymer mixture is melt spun (melt temperature, 365° C.) using a Capillograph (die diameter, 2 mm) manufactured by Toyo Seiki Seisaku-sho, Ltd., Tokyo, Japan and equipped with a high-speed take-off device, giving fluoropolymer composite fibers. The speed on the take-off device is set at 100 m/min, and a fluoropolymer composite fiber having a diameter of about 50 $\mu$m is obtained. The draw ratio is 1600. The draw ratio is computed as follows.

Draw ratio=(cross-sectional area of capillary die orifice)/ (cross-sectional area of fluoropolymer composite fiber)

The measurement results for percent shrinkage of the fluoropolymer composite fibers thus obtained are summarized in Table 1. A specimen having a length of 300 mm is heat-treated for 30 minutes at 100° C., 150° C., 200° C. and 250° C., following which the specimen is cooled to 25° C. The percent shrinkage is determined from the change in length using the following formula.

Percent Shrinkage=(length before heating−length after heating)/ (length before heating)×100

A filament having a diameter of about 50 $\mu$m is selected from the fluoropolymer composite fiber obtained above. A specimen of the filament having a length of 250 mm is subjected to tensile testing at a pulling speed of 300 m/min, and the tensile modulus, tensile strength and elongation are measured. The results are summarized in Table 2.

Figure 2A:
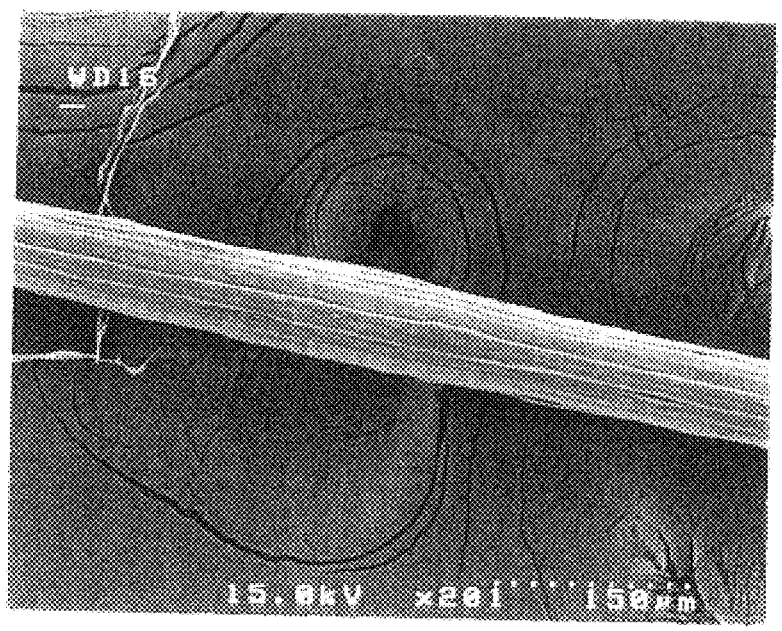
FIG. 2 are electron micrographs at 200× magnification of fluoropolymer composite fibers obtained, respectively, in Example 1 (a) (FIG. 1 (*a*)), Example 2 (b) (FIG. 2(*a*)), and Comparative Example 1 (c) (FIG. 3(*a*)).

Scanning electron microscopic (SEM) examination of the fluoropolymer composite fiber obtained in this example shows that, at a draw ratio of 1600, most of the liquid-crystal polymer has formed fibrous structures having a diameter of 1 to 3 $\mu$m (FIG. 1). FIG. 2(a) shows the variability in fiber diameter with compatibilizing agent content, as observed under an electron microscope. The results of measurements of the variability in outside diameter are summarized in Table 3.

Example 2

Figure 2B:
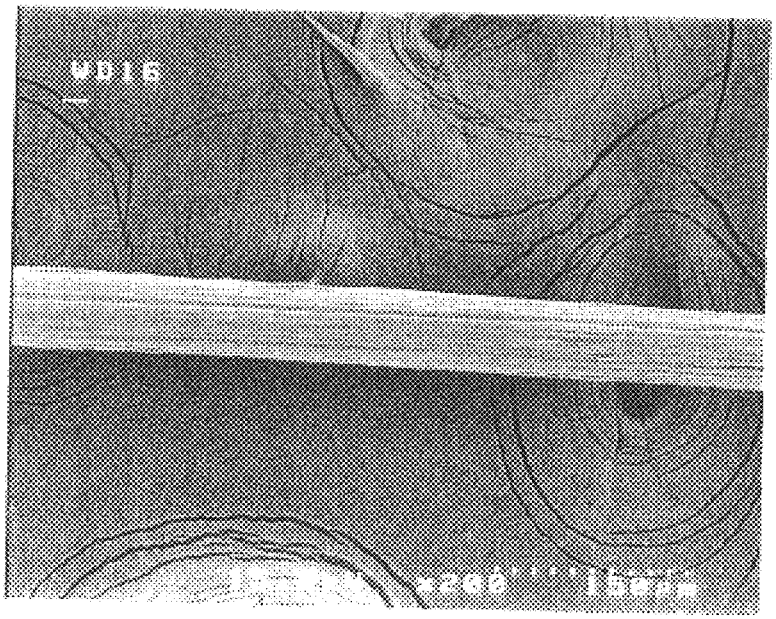

Fluoropolymer composite fibers are fabricated by the same procedure as in Example 1, except that the proportion of compatibilizing agent A in the mixture is increased to 5% by weight. The fiber is similarly subjected to tensile tests, electron micrographic observation, and measurement of the variability in the outside diameter. The results are summarized in Table 2, FIG. 2b, and Table 3. Increasing the amount of compatibilizing agent A makes the outside diameter of the fiber more uniform and increases the tensile modulus.

Comparative Example 1

Figure 2C:
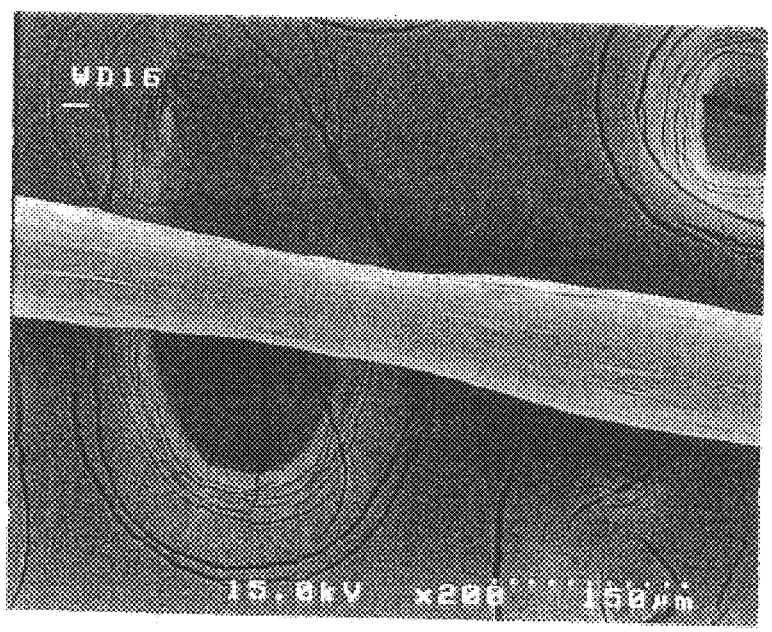

A fluoropolymer composite fiber is fabricated by the same procedure as in Example 1, except that only a fluoropolymer and a liquid-crystal polymer are used. No compatibilizing agent is included. The fiber is similarly subjected to tensile tests, electron micrographic observation, and measurement of the variability in the outside diameter. The results are summarized in Table 2, FIG. 2c, and Table 3. Without the use of compatibilizing agent, the outside diameter of the fiber is irregular.

Reference Example 1

This is an example in which liquid-crystal polymer and compatibilizing agent are not used. PFA pellets are melt-spun directly without modification to form a fiber. The percent shrinkage is measured and the fiber is subjected to tensile testing in the same manner as in Example 1. The results are summarized in Tables 1 and 2.

TABLE 1

|  | Ref. Ex. 1 | Example 1 |
| --- | --- | --- |
| PFA (wt %) | 100 | 88 |
| Liquid-crystal polymer (wt %) | 0 | 10 |
| Compatibilizing agent A (wt %) | 0 | 2 |
| Percent shrinkage at 100° C. (%) | 1 | 0.2 |
| Shrinkage at 150° C. (%) | 2 | 0.3 |
| Shrinkage at 200° C. (%) | 3.7 | 0.5 |
| Percent shrinkage at 250° C. (%) | 7.5 | 2.2 |

TABLE 2

|  | Ref. Ex. 1 | Comp. Ex. 1 | Example 1 | Example 2 |
| --- | --- | --- | --- | --- |
| PFA (wt %) | 100 | 90 | 88 | 85 |
| Liquid-crystal polymer (wt %) | 0 | 10 | 10 | 10 |
| Compatibilizing agent A (wt %) | 0 | 0 | 2 | 5 |
| Draw ratio | 1600 | 1600 | 1600 | 1600 |
| Fiber diameter (μm) | Approx. 50 | approx. 50 | approx. 50 | approx. 50 |
| Tensile modulus (GPa) | 1.5 | 3.2 | 3.9 | 6.6 |
| Tensile strength (MPa) | 131 | 77 | 76 | 98 |
| Elongation (%) | 38 | 72 | 65 | 38 |

In the fiber shrinkage tests in Table 1, the fibers in which a fibrous liquid-crystal polymer phase is present in the PFA matrix (Example 1) have a much lower shrinkage than pure PFA fiber (Reference Example 1). Even at a temperature of 250° C., the shrinkage of fiber containing the liquid-crystal polymer phase is about 30% the shrinkage of pure PFA fibers.

As is apparent from the tensile test results in Table 2, the tensile modulus rose as the amount of compatibilizing agent added is increased. The tensile modulus of fiber containing 5% of compatibilizing agent (Example 2) is more than 4 times higher than the modulus of pure PFA fiber (Reference Example 1). This is because the interfacial bonding between the PFA and liquid-crystal polymer is enhanced by the compatibilizing agent.

As is apparent from FIG. 1, numerous liquid-crystal polymer fibrils that formed in the melt spinning step are present at the interior of the fluoropolymer composite fiber. This fibrous liquid-crystal polymer phase contributes to the high tensile modulus, low elongation, and low shrinkage of the fluoropolymer composite fibers.

From the influence on the outside diameter of the fluoropolymer composite fiber shown in FIG. 2, it is evident that the incorporation of compatibilizing agent has the effect of making the outside diameter of the fluoropolymer composite fiber uniform in the melt spinning process. The reason appears to be that the inclusion of compatibilizing agent lowers the interfacial tension between the PFA and the liquid-crystal polymer, resulting in uniform distribution of the liquid-crystal polymer in the PFA matrix during melting and mixing in the twin-screw extruder. Because the fluoropolymer mixture in which the particle size distribution of the liquid-crystal polymer is uniform does not undergo any change in the average melt viscosity during melt spinning at a constant take-off speed, the outside diameter of the fiber is uniform. However, a fluoropolymer mixture which does not contain compatibilizing agent and in which the liquid-crystal polymer phase is thus non-uniform (Comparative Example 1) is subject to fluctuations in melt viscosity depending on the size of the liquid-crystal phase. Such fluctuations could cause the outside diameter of the fiber to become non-uniform in a melt spinning process at a uniform take-off speed.

It is thus apparent that compatibilizing agent must be used in order to produce by melt spinning a fluoropolymer composite fiber of uniform outside diameter with high tensile modulus and low shrinkage.

Example 3

A fluoropolymer composite fiber is produced in as in Example 2, except that 5% by weight of compatibilizing agent B, which is a terpolymer of tetrafluoroethylene, PPVE and the monomer of the formula

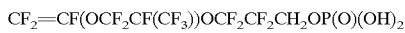

(PPVE content, 3.4% by weight; content of phosphorus-bearing monomer, 1.2% by weight) is incorporated instead of compatibilizing agent A. The variability in the outside diameter is similarly investigated. The results are summarized in Table 3.

Example 4

A fluoropolymer composite fiber is produced in as in Example 2, except that 5% by weight of compatibilizing agent C, which is a terpolymer of tetrafluoroethylene, PPVE and the monomer of the formula

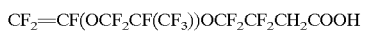

(PPVE content, 3.7% by weight; content of carboxyl group-bearing monomer, 4.3% by weight) is incorporated instead of compatibilizing agent A. The variability in the outside diameter is similarly investigated. The results are summarized in Table 3.

Example 5

A fluoropolymer composite fiber is produced as in Example 2, except that 5% by weight of compatibilizing agent D, which is a terpolymer of tetrafluoroethylene, PPVE and the monomer of the formula

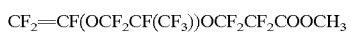

(PPVE content, 3.7% by weight; content of ester group-bearing monomer, 1.0% by weight) is incorporated instead of compatibilizing agent A. The variability in the outside diameter is similarly investigated. The results are summarized in Table 3.

TABLE 3

|  |  | Comp. Ex. 1 | Ex. 1 | Ex. 2 | Ex. 3 | Ex. 4 | Ex. 5 |
|---|---|---|---|---|---|---|---|
| Starting materials (wt %) | PFA | 90 | 88 | 85 | 85 | 85 | 85 |
|  | Liquid-crystal polymer | 10 | 10 | 10 | 10 | 10 | 10 |
|  | Compatibilizing agent A |  | 2 | 5 |  |  |  |
|  | Compatibilizing agent B |  |  |  | 5 |  |  |
|  | Compatibilizing agent C |  |  |  |  | 5 |  |
|  | Compatibilizing agent D |  |  |  |  |  | 5 |
| Fiber outside diameter (μm) |  | 50–80 | 47–60 | 48–52 | 47–54 | 51–64 | 50–66 |

From the fluoropolymer composite fiber outside diameter results summarized in Table 3, the outside diameter of the fiber can be seen to vary somewhat on account of differences in the degree of interaction with the liquid-crystal polymer according to the type of compatibilizing agent. However, in each of these cases, use of the compatibilizing agent results in smaller variability in the outside diameter than in Comparative Example 1, in which a compatibilizing agent is not used.

The present invention provides fluoropolymer composite fibers of uniform outside diameter comprising a fluoropolymer matrix in which is uniformly dispersed a fibrous liquid-crystal polymer. Such composite fibers have higher modulus and lower shrinkage than fibers composed solely of fluoropolymer. Moreover, the use of a liquid-crystal polymer having a higher melting point than the fluoropolymer results in a higher deflection temperature. Such composite fibers can be obtained by spinning from a molten blend of fluoropolymer and liquid-crystal polymer. Because such a blend has a lower melt viscosity than fluoropolymer by itself, melt spinning is easy and can be carried out at a high speed. In addition, the presence of liquid-crystal polymer having polarity provides the additional advantage of making it possible to prevent entanglement between the fibers due to static electricity during melt spinning.

Fluoropolymer composite fibers such as these can be used in a wide range of applications. For example, they may be used in the form of bag filters for solid waste incinerators, wherein heat resistance, chemical resistance, and high strength (that is, greater dimensional stability under stress) are required. In particular, because these fibers retard the accumulation of static electricity, dust is easy to remove from the bag filter.

The present invention is not limited to composite fibers, and provides also composite articles of various other shapes and forms which contain fibrous liquid-crystal polymer in a fluoropolymer matrix. As with the composite fibers described above, such other composite articles are similarly endowed with high modulus, high deflection temperature, and low shrinkage, giving them great potential for use in a range of applications. Examples include pipe, tubing, and containers, such as laboratory ware.

What is claimed is:

1. A melt processable composite fiber comprising at least one melt processable fluoropolymer, wherein a portion of said melt processable fluoropolymer contains functional groups, reinforced with fibrous thermoplastic liquid crystal polymer.

2. The fiber of claim 1 wherein said functional groups are selected from the group consisting of carboxyl and derivative groups thereof, hydroxyl, nitrile, cyanato, carbamoyloxy, phosphonoxy, halophosphonoxy, sulfonic and derivative groups thereof, and sulfohalide.

3. The melt processable fluoropolymer composite fiber of claim 1 wherein the melt processable fluoropolymer comprises a polymer or copolymer of one or more monomers selected from the group consisting of tetrafluoroethylene, chlorotrifluoroethylene, hexafluoropropylene, perfluoro (alkyl vinyl ether), vinylidene fluoride, and vinyl fluoride, and wherein a fluorine-bearing monomer containing said functional groups is additionally copolymerized with said one or more monomers.

4. The fiber of claim 1 wherein said liquid-crystal polymer is in the form of fibers dispersed within said fluoropolymer.

5. The fiber of claim 1 wherein said fiber is bicomponent fiber, a first component of said fiber being said fluoropolymer, and a second component of said fiber being said fibrous liquid-crystal polymer.

6. The fiber of claim 5 wherein said fibrous liquid-crystal polymer forms the core of said bicomponent fiber, and said fluoropolymer forms the sheath thereof.

7. The fiber of claim 1 wherein said portion of fluoropolymer containing functional groups is from about 1% to about 20% by weight of the combined weights of the fluoropolymer and the liquid-crystal polymer.

8. The fiber of claim 1 wherein said liquid-crystal polymer is from about 1% to about 40% by weight of the combined weights of the fluoropolymer and the liquid-crystal polymer.

* * * * *